(12) United States Patent
Keshavarz et al.

(10) Patent No.: US 9,257,710 B2
(45) Date of Patent: Feb. 9, 2016

(54) FLOW BATTERY START-UP AND RECOVERY MANAGEMENT

(75) Inventors: Majid Keshavarz, Pleasanton, CA (US); Gopalakrishnan R. Parakulam, Cupertino, CA (US); Bhaskar Sompalli, Fremont, CA (US); Joe Simon, Newark, CA (US)

(73) Assignee: IMERGY POWER SYSTEMS, INC., Fremont, CA (US)

( * ) Notice: Subject to any disclaimer, the term of this patent is extended or adjusted under 35 U.S.C. 154(b) by 704 days.

(21) Appl. No.: 13/350,688

(22) Filed: Jan. 13, 2012

(65) Prior Publication Data

US 2012/0183872 A1 Jul. 19, 2012

Related U.S. Application Data

(60) Provisional application No. 61/432,552, filed on Jan. 13, 2011.

(51) Int. Cl.
*H01M 8/04* (2006.01)
*H01M 8/18* (2006.01)

(52) U.S. Cl.
CPC .......... *H01M 8/04223* (2013.01); *H01M 8/188* (2013.01); *Y02E 60/528* (2013.01)

(58) Field of Classification Search
CPC .................. H01M 8/188; H01M 8/04231

USPC ........................................................ 429/429
See application file for complete search history.

(56) References Cited

U.S. PATENT DOCUMENTS

| | | | |
|---|---|---|---|
| 2007/0099040 A1* | 5/2007 | Morita et al. | 429/22 |
| 2007/0224482 A1 | 9/2007 | Shimoi et al. | |
| 2010/0003545 A1 | 1/2010 | Horne et al. | |
| 2010/0003586 A1 | 1/2010 | Sahu | |
| 2010/0122911 A1* | 5/2010 | Song et al. | 205/206 |
| 2010/0323264 A1* | 12/2010 | Chiang et al. | 429/449 |
| 2012/0208061 A1 | 8/2012 | Sahu et al. | |

OTHER PUBLICATIONS

International Preliminary Report on Patentability and the Written Opinion mailed Jul. 25, 2013, in related International Application No. PCT/US2012/021377.
PCT International Search Report and Written Opinion mailed May 21, 2012, in related International Application No. PCT/US2012/021377.

* cited by examiner

*Primary Examiner* — Sarah A Slifka
*Assistant Examiner* — Brent Thomas
(74) *Attorney, Agent, or Firm* — Haynes and Boone, LLP

(57) ABSTRACT

A start-up plating process for a flow cell battery is disclosed. Upon start-up of the flow-cell stack, catalysts may have deplated from the electrodes. The catalyst is replated to the electrode by application of currents to the stack prior to circulating electrolyte fluids.

5 Claims, 4 Drawing Sheets

FLOW BATTERY START-UP AND RECOVERY MANAGEMENT

REFERENCE TO RELATED APPLICATIONS

The present invention claims priority to U.S. Provisional Application No. 61/432,552, entitled "Flow Battery Start-Up and Recovery Management", filed on Jan. 13, 2011, the contents of which are herein incorporated by reference in its entirety.

BACKGROUND

1. Technical Field

The present invention is related to flow battery start-up and recovery.

2. Discussion of Related Art

Reduction-oxidation (redox) flow batteries store electrical energy in a chemical form, and subsequently dispense the stored energy in an electrical form via a spontaneous reverse redox reaction. A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving fluid through the system. The reaction in a flow battery is reversible; the electrolyte can be recharged without replacing the electroactive material. The energy capacity of a redox flow battery, therefore, is related to the total electrolyte volume (i.e., the size of the storage tank). The discharge time of a redox flow battery at full power also depends on electrolyte volume and can vary from several minutes to many days.

The minimal unit that performs the electrochemical energy conversion is generally called a "cell," whether in the case of flow batteries, fuel cells, or secondary batteries. A device that integrates many such cells, coupled electrically in series and/or parallel to get higher current, voltage, or both, is generally called a "battery." However, it is common to refer to any collection of coupled cells, including a single cell used on its own, as a battery. As such, a single cell can be referred to interchangeably as a "cell" or a "battery."

Redox flow batteries can be utilized in many technologies that require the storage of electrical energy. For example, redox flow batteries can be utilized to store night-time electricity that is inexpensive to produce, and to subsequently provide electricity during peak demand when electricity is more expensive to produce or demand is beyond the capability of current production. Such batteries can also be utilized for storage of green energy (i.e., energy generated from renewable sources such as wind, solar, wave, or other non-conventional sources). Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure in a generating station.

Therefore, there is a need for better performing flow cell batteries.

SUMMARY

In accordance with some embodiments of the present invention a method of performing a start-up of a flow cell stack includes applying a current to the stack to plate a catalyst on an electrode while leaving circulation pumps off; and turning circulation pumps on after plating is completed.

In some embodiments, a flow cell system can include a flow cell stack; a first circulation pump fluidically coupled between a first electrolyte tank and the flow cell stack to circulate the a electrolyte through the flow stack; a second circulation pump fluidically coupled between a second electrolyte tank and the flow cell stack to circulate a second electrolyte through the flow stack; a first mixing valve fluidically coupled between the first circulation pump and the second circulation pump to allow for mixing of the first electrolyte and the second electrolyte in the second electrolyte tank; a second mixing valve fluidically coupled between the second circulation pump and the first circulation pump to allow for mixing of the second electrolyte and the first electrolyte in the first electrolyte tank; and a start-up controller electrically coupled to provide voltages and currents to the stack, to provide control signals to the first circulation pump and the second circulation pump, and to provide control signals to the first mixing valve and the second mixing valve.

These and other embodiments of the invention are further described below with respect to the following figures.

Figure 1:
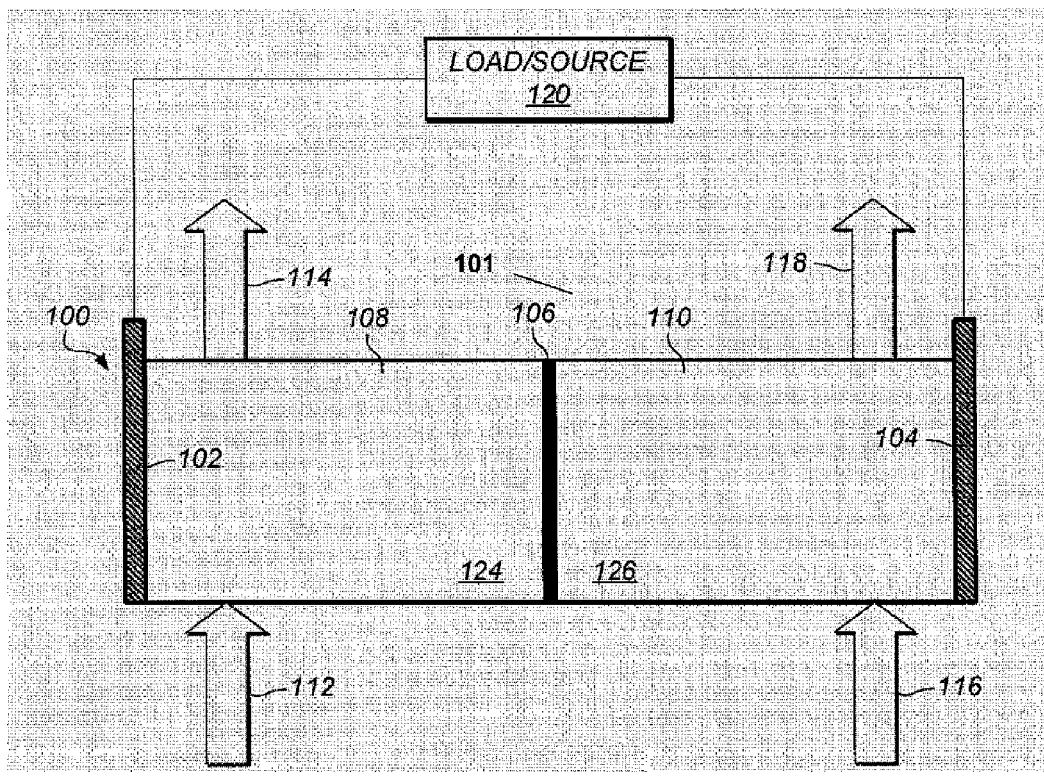
FIG. 1 illustrates a reduction-oxidation (redox) system according to some embodiments of the present invention.

In the figures, elements having the same designation have the same or similar functions. The figures are illustrative only and relative sizes and distances depicted in the figures are for convenience of illustration only and have no further meaning.

DETAILED DESCRIPTION

In the following description, for the purposes of explanation, specific details are set forth in order to provide a thorough understanding of some embodiments of the invention. However, it will be apparent that the invention may be practiced without these specific details.

In the flow battery there are times when the Flow battery goes into a Shutdown State due to a leak in the System, an intentionally shutting the System down, hibernation, or other action. In each of these cases, the electrolyte in the flow cell battery will stay in the stack. The Voltage of the Stack will drop slowly based on the Shutcurrent and Diffusion current in the Stack. This drop in voltage causes the Stack to deplate once the stack voltage drops below the deplating voltage. This deplating of the Stack will cause the System performance to deteriorate once the System starts. Hence a Plating cycle is warranted.

As used in the present specification, the following words and phrases are generally intended to have the meanings as set forth below, except to the extent that the context in which they are used indicates otherwise.

As described herein, the term "cell" refers generally to any unit capable of performing electrochemical energy conversion. Exemplary cells include, but are not limited to, redox flow batteries, fuel cells, and secondary batteries.

As described herein, the term "membrane" refers to any material that forms a barrier between fluids, for example between electrochemical half-cells (e.g., an anode compartment and a cathode compartment). Exemplary membranes may be selectively permeable, and may include porous membranes and ion-selective membranes. Exemplary membranes may include one or more layers, wherein each layer exhibits a selective permeability for certain species (e.g., ions), and/or affects the passage of certain species.

As described herein, the term "fluid communication" refers to structures which are in contact with, but not necessarily affixed to, one another, whereby a fluid or gas can pass from one structure to the other. For example, two structures may be in fluid communication with one another by a channel, conduit, opening, and/or valve, even if the communication includes a valve in a closed state but provided that the valve may be opened, whereby a fluid or gas may be moved from one of the structures to the other. In addition, two structures may be considered to be in fluid communication with each other even in circumstances where one or more intermediate structures divert and/or interrupt the flow of the fluid or gas from the first structure to the second structure, so long as flow of the fluid or gas from the one or more intermediate structures to the second structure is ultimately possible.

As described herein, the "chromium side" of a cell refers generally to the negative side of a Cr/Fe based redox flow cell. In some embodiments, the oxidation of chromium occurs at the chromium side of the cell.

As described herein, the "iron side" of a cell refers generally to the positive side of a Cr/Fe based redox flow cell. In some embodiments, the reduction of iron occurs at the iron side of the cell.

FIG. 1 illustrates a schematic drawing of a simplified redox flow cell battery system 100. As shown, redox flow cell system includes redox flow cell stack 101. Stack 101 is represented by a single flow cell, which includes two half-cells 108 and 110 separated by a membrane 106. Typically, stack 101 will include a plurality of single flow cells. An electrolyte 124 is flowed through half-cell 108 and an electrolyte 126 is flowed through half-cell 110. Half-cells 108 and 110 include electrodes 102 and 104, respectively, in contact with electrolytes 124 and 126, respectively, such that redox reactions occur at the surface of the electrodes 102 or 104. In some embodiments, multiple redox flow cells are electrically coupled (e.g., stacked) either in series to achieve higher voltage or in parallel in order to achieve higher current to form stack 101. The stacked cells are collectively referred to as a battery stack and flow cell battery can refer to a single cell or battery stack. As shown in FIG. 1, electrodes 102 and 104 are coupled across load/source 120, through which electrolytes 124 and 126 are either charged or discharged.

When filled with electrolyte, half-cell 110 of redox flow cell 100 contains anolyte 126 and the other half-cell 108 contains catholyte 124, the anolyte and catholyte being collectively referred to as electrolytes. Reactant electrolytes may be stored in separate reservoirs and dispensed into half-cells 108 and 110 via conduits coupled to cell inlet/outlet (I/O) pipes 112, 114 and 116, 118 respectively. In some embodiments, an external pumping system is used to transport the electrolytes to and from the redox flow cell. Electrolyte 124 flows into half-cell 108 through inlet pipe 112 and out through outlet pipe 114, while electrolyte 126 flows into half-cell 110 through inlet pipe 116 and out of half-cell 110 through outlet pipe 118.

At least one electrode 102 and 104 in each half-cell 108 and 110 provides a surface on which the redox reaction takes place and from which charge is transferred. Suitable materials for preparing electrodes 102 and 104 generally include those known to persons of ordinary skill in the art. Redox flow cell 100 operates by changing the oxidation state of its constituents during charging or discharging. The two half-cells 108 and 110 are connected in series by the conductive electrolytes, one for anodic reaction and the other for cathodic reaction. In operation (e.g., during charge or discharge), electrolytes 126 and 124 are flowed through half-cells 108 and 110 through I/O pipes 112, 114 and 116, 118 respectively as the redox reaction takes place.

Positive ions or negative ions pass through permeable membrane 106, which separates the two half-cells 108 and 110, as the redox flow cell system 100 charges or discharges. Reactant electrolytes are flowed through half-cells 108 and 110, as necessary, in a controlled manner to supply electrical power or be charged by load/source 120. Suitable membrane materials for membrane 106 include, but are not limited to, materials that absorb moisture and expand when placed in an aqueous environment. In some embodiments, membrane 106 may comprise sheets of woven or non-woven plastic with active ion exchange materials such as resins or functionalities embedded either in a heterogeneous (such as co-extrusion) or homogeneous (such as radiation grafting) way. In some embodiments, membrane 106 may be a porous membrane having high voltaic efficiency Ev and high coulombic efficiency and may be designed to limit mass transfer through the membrane to a minimum while still facilitating ionic transfer. In some embodiments, membrane 106 may be made from a polyolefin material and may have a specified thickness and pore diameter. A manufacturer having the capability to manufacture these membranes, and other membranes consistent with embodiments disclosed, is Daramic Microporous Products, L.P., N. Community House Rd., Suite 35, Charlotte, N.C. 28277. In certain embodiments, membrane 106 may be a nonselective microporous plastic separator also manufactured by Daramic Microporous Products L.P. A flow cell formed from such a membrane is disclosed in U.S. Published Patent App. No. 2010/0003586, filed on Jul. 1, 2008, which is incorporated herein by reference in its entirety.

In some embodiments, multiple redox flow cells may be stacked to form a redox flow cell battery system. Construction of a flow cell stack battery system is described in U.S. patent application Ser. No. 12/577,134, entitled "Common Module Stack Component Design" filed on Oct. 9, 2009, which is incorporated herein by reference in its entirety. Another stack design is described in U.S. patent application Ser. No. 13/350, 424, filed on Jan. 13, 2012, claiming priority to provisional application 61/432,541, filed on Jan. 13, 2011, which is herein incorporated by reference in its entirety.

In some embodiments of redox flow cell 100 in FIG. 1, electrolyte 124 includes an aqueous acid solution. In some embodiments, the acidic solution includes aqueous hydrochloric acid. Electrolyte 124 further includes at least one metal salt (e.g., a metal chloride salt). In some embodiments, electrolyte 126 comprises an aqueous acid solution. In some embodiments, the acidic solution includes aqueous hydrochloric acid. Electrolyte 126 further includes at least one metal salt (e.g., a metal chloride salt).

In one embodiment, a redox flow cell battery system is based on a Cr/Fe redox pair. The remainder of the description will be based on a Cr/Fe redox flow cell battery, however, it should be understood that the concepts described herein may also be applied to other metals. In an embodiment of a Cr/Fe redox flow cell battery, both electrolytes 124 and 126 include a solution of $FeCl_2$ and $CrCl_3$ in aqueous HCl.

During starting the system, a catalyst (for example Bismuth) is plated onto electrodes 102 and 104 shown in FIG. 1. The catalyst promotes the chemical reactions involved in the charging and discharging reactions in the cell. The chromium reactions are sluggish. The problem of the speed of the chromium reaction has been overcome by the addition of catalysts, for example Bismuth. The catalyst is introduced in the electrolyte solution upon initial startup. The first time, the catalyst is deposited on the surface of the electrode in a plating process. The existence of the catalyst plated on electrode 104 facilitates the chromium reactions. Typically, the plating process is performed dynamically with electrolytes flowing through the stack.

However, upon shut down the catalyst slowly dissolves into the electrolyte and the catalyst is no longer plated. Therefore, when a System 100 goes into a shutdown mode, a hibernation mode, or is intentionally turned OFF there is a possibility for system 100 to deplate the catalyst, resulting in a need to avoid the deplating process or to replate electrodes 104.

Upon system shut down or hibernation, stack 101 will self-discharge due to electrolyte cross diffusion through porous membrane 106 and consequently catalyst gets oxidized and dissolved (i.e., deplated). The reactions that occur during shutdown upon cross diffusion include

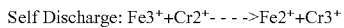

Self Discharge: $Fe^{3+}+Cr^{2+} \longrightarrow Fe^{2+}+Cr^{3+}$

Deplating: $3Fe^{3+}+Bi \longrightarrow 3Fe^{2+}+Bi^{3+}$

The deplating process results in high equivalent series resistance (ESR). During Startup after Shutdown, Hibernation or intentional shutoff, when catalyst is deplated, improper plating can be promoted if charging currents are not low. Improper plating promotes undesired side reactions like $H_2$ generation. However, there is often a need to restart the system in a timely manor without going through the often slow dynamic plating process.

Figure 3:
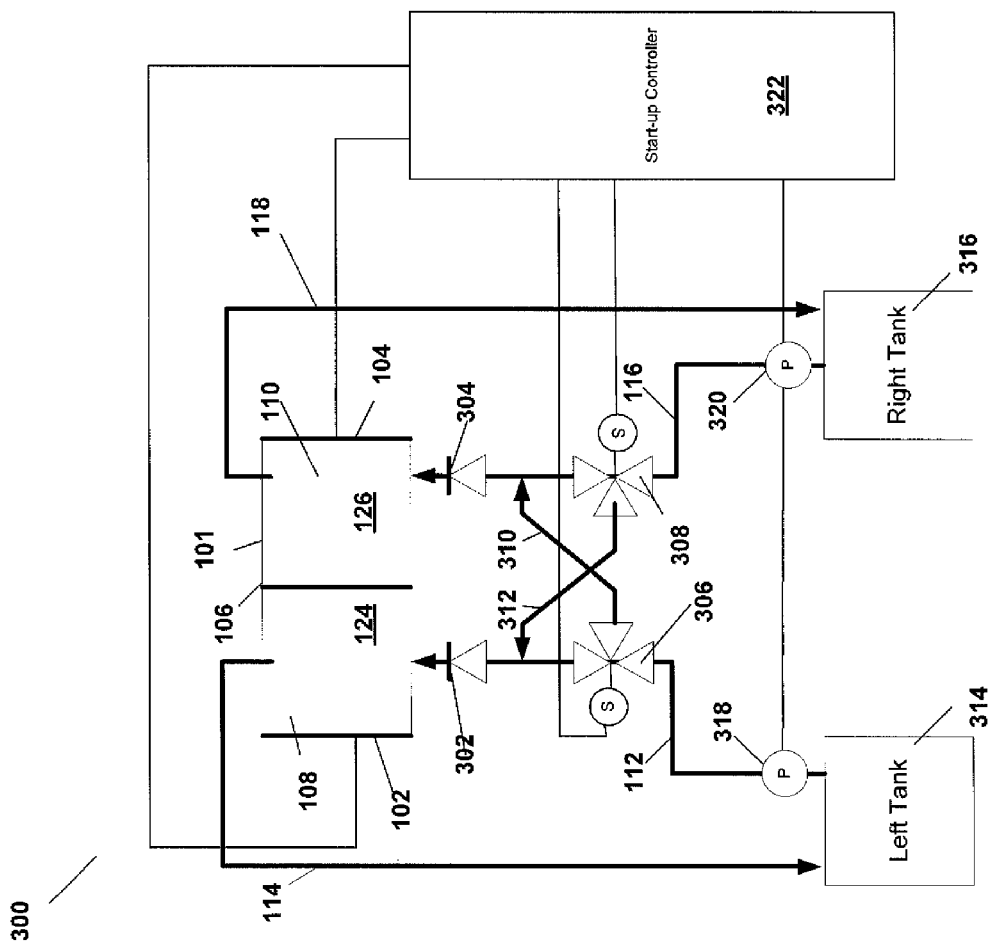
FIG. 3 illustrates a stack configured according to some embodiments of the present invention.

FIG. 3 illustrates a system 300 according to some embodiments of the present invention. As shown in FIG. 3, pipes 114 and 112 fluidically couples half-cell 108 with left tank 314 and pipes 116 and 118 fluidically couple half-cell 110 to right tank 316. Left tank 314 and right tank 316 include electrolytes. Note that although stack 101 is illustrated with a single cell having half-cells 108 and 110, stack 110 generally includes a stack of individual cells. As shown in FIG. 3, electrolyte 124 from left tank 314 is pumped through half cell 108 by circulation pump 318. Electrolyte 128 is pumped from right tank 316 by circulation pump 320. System 300 includes check vales 302 and 304 to prevent electrolyte 124 and 126, respectively, from draining from half cells 108 and 110, respectively, back into tanks 314 and 316, respectively. Cross-mixing valves 306 and 308 can be utilized to mix electrolytes in tank 314 and tank 316 through stack 101.

Although check valves 302 and 304 are shown between mixing valves 306 and 308 and half-cells 108 and 110, respectively, other placements are possible. For example, in some embodiments check valves 302 and 304 can be provided between mixing valves 306 and 308 and pumps 318 and 320, respectively. In general, check valves 302 and 304 can be placed in any position to prevent electrolytes 124 and 126 from flowing back into tanks 314 and 316, respectively.

As is further shown in FIG. 3, a start-up controller 322 is electrically coupled to control voltages and currents on electrodes 102 and 104 and operation of circulation pumps 318 and 320. Controller 322 can also control cross-mixing valves 306 and 308.

In according with some embodiments of the present invention, controller 322 can apply a small current to stack 101 during start-up to re-plate the catalyst before system 100 is fully turned on. The current can be applied prior to turning the circulation pumps on so that the catalyst that remains within stack 101 can be re-plated onto electrodes 104.

Upon electrolyte cross diffusion through membrane 106, the dissolved catalyst stays in the porous felt of membrane 106 as long as circulation pumps 318 and 320 are off, although some catalyst may diffuse across membrane 106. Therefore, the catalyst can be re-plated prior to turning pumps 318 and 320 on, since all dissolved catalysts remain in stack 101. In this case current density may be very low (0.5 mA/cm2 to 10 mA/cm2) in a "Static Plating" process. At the negative electrode (the chromium side), the static plating process involves

$Bi^{3+}+3e^- \longrightarrow Bi$

$Cr^{3+}+e^- \longrightarrow Cr^{2+}$.

At the positive (iron side) electrode, the reaction is

$Fe^{2+} \longrightarrow Fe^{3+}+e^-$.

Figure 2:
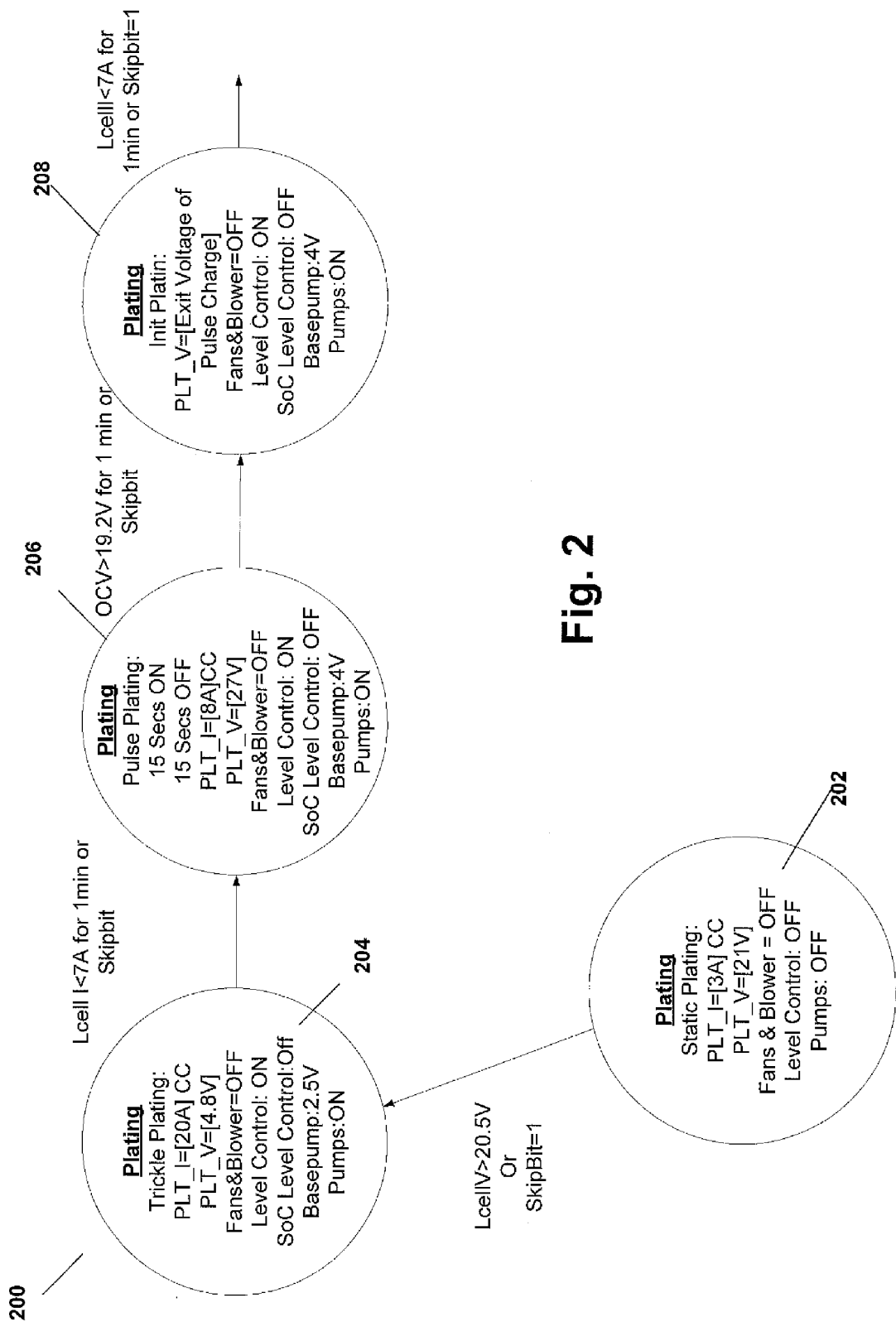
FIG. 2 illustrates a state function for performing plating according to some embodiments of the present invention.

FIG. 2 illustrates an embodiment of a static plating state function 200 that controller 322 can execute for plating the catalyst on electrodes 102 and 104 prior to start-up of system 100. Plating state function 200 is divided into 4 States: static plating 202, trickle plating 204, pulse plating 206, and Init plating. Each state has a provision to be forced out of the state through a remote request.

Static plating 200 happens when ever System 300 starts up, transitions from hibernation or from a shutdown state. During static plating 202, pumps 318 and 320 are OFF in order to keep the dissolved catalyst stack 101 and a low current, for example 1.3 mA/cm2, is applied. Exit from Static plating 204 happens when a particular voltage, for example 0.85V/cell, is reached. Static plating state 202 can be skipped when a pristine stack is installed, a forced de-plate has occurred, or a remote request to skip static plating has been received. During Static plating 202 the plating material that is dislodged from stack 100 and captured in the Electrolyte is plated back to the Stack electrode 104. As shown in FIG. 3, check valves 302 and 304 can prevent electrolytes 124 and 126 from draining from stack 101, ensuring that the catalyst remains within stack 101 to be replated.

During the trickle plating state 204 system 300 is charged to a predefined voltage level. This level is lower than the plating potential. Trickle plating is performed to speed up the plating process. The reason for e trickle plating state 204 is to change from Ferric to Ferrous state. During trickle plating, pumps 314 and 316 are turned on.

In the pulse plating state 206 the plating occurs on the electrode of stack 101 through the catalyst found in the tank electrolyte. Controller 322 applies a plating current periodically, for example current is applied in 15 sec ON pulse and 15 sec OFF. This is done until a particular OCV, for example 0.8 V per cell, is achieved. During this process, electrolyte circulation pumps 318 and 320 are turned on.

During the exit from pulse plating state 206 to Init-plating state 208 a low current charging maintained. The initial charging process is performed to avoid any de-plating that might happen when the system is switched directly to a high current charging mode.

A circuit, the Sys Dongledescribed in U.S. application Ser. No. 12/844,059, filed on Aug. 12, 2010, which is herein incorporated by reference in its entirety, keeps track of the Stack 100 that is installed in a particular system. When a Stack is changed the Sys Dongle gets updated with the new Stack serial number. The firmware also notes the change in the stack serial number and sets a flag to force out of Static pre-charge state. Therefore, a normal plating process is performed on a pristine stack rather than the static plating state function 200 described above. In the case of a pristine stack, the catalyst is distributed throughout the electrolyte solution and is not confined to the stack itself, as it is during a shutdown or shut off.

In some cases, a forced deplate process may be performed. This may happen when the plating is not uniform across the electrodes and a reason to re-plate the entire stack is found. If the System H2 generation goes up, there might be case where the Stack plating might be compromised. FIG. 3 illustrates a stack configured to allow for a forced deplating process, complete with pumps 306 and 308 for cross—mixing the electrolytes. As shown in FIG. 3, electrolyte 126 typically originates from tank 316 and electrolyte 124 originates from left tank 314. Valve 306 can allow electrolyte from left tank 314 through pipe 310 into pipe 116, mixing electrolyte 126 and with electrolyte 124 in right tank 316. Additionally, valve 308 can allow electrolyte from right tank 316 through pipe 312 into pipe 112, mixing electrolyte 124 with electrolyte 126 in left tank 314. Therefore, electrolyte mixing can readily occur when pumps 318 and 320 are ON and valves 306 and 308 are opened.

System 100 can be put into a Force-Deplate State. This can be achieved by sending a remote request to the System 100. The System can be in Charge or Discharge State at this time. A Force-Deplate State entry happens after a Hibernate State. During the forced Deplate State the electrolytes from tanks 314 and 316 are cross mix through the Stack for a period of time, for example 0.5 hrs. After Cross-mixing, System 100 enters Static plating state function 200 described above.

Figure 4:
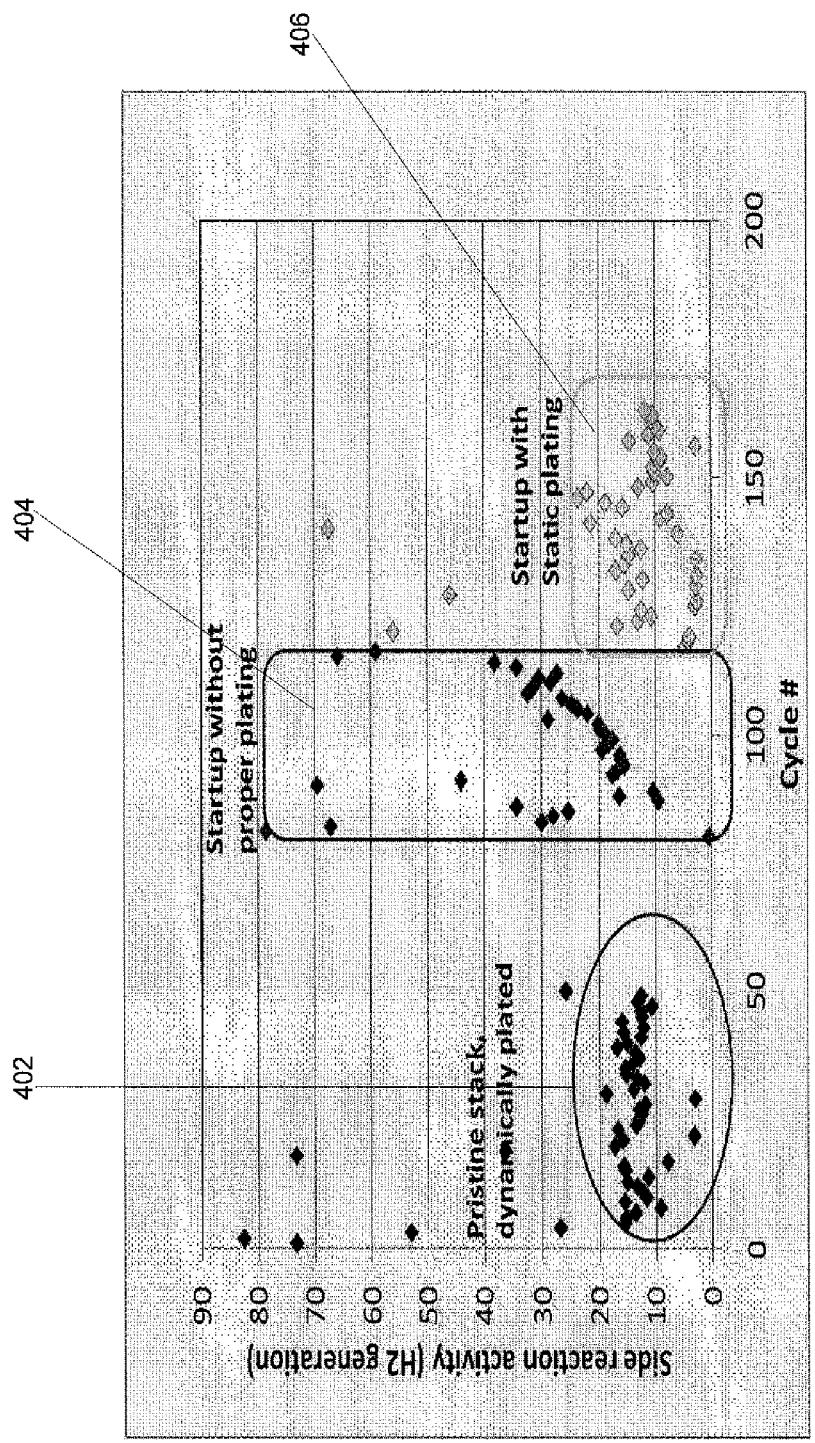
FIG. 4 illustrates the results of performing a plating function upon startup.

FIG. 4 illustrates the results of performing a startup plating process as opposed to not having a startup plating process upon startup. As shown in FIG. 4, the graph provides hydrogen production for each start-up of a flow cell system 100. Area 402 indicates production with a pristine stack that has been dynamically plated. Area 404 provides the results of a startup without a plating process. Area 406 provides the results of hydrogen product when a static plating function 200 is executed. As is observed, hydrogen production upon startup is much reduced with application of the static plating process.

As is further shown in FIG. 3, in some embodiments check valves 302 and 304 are provided to prevent drainage of electrolytes 124 and 126 during a shutdown. In case of an intentional or unintentional shutting OFF of System 100, the Electrolyte is prevented from draining from the Stack by these check valve 302 and 304. In that case, electrolyte with the catalyst remains in the stack during the shut-down and can be replated without turning circulation pumps on during startup.

Further embodiments can be envisioned to one of ordinary skill in the art after reading this disclosure. In other embodiments, combinations or sub-combinations of the above disclosed invention can be advantageously made. The specification and drawings are, accordingly, to be regarded in an illustrative rather than restrictive sense. It will, however, be evident that various modifications and changes may be made thereunto without departing from the broader spirit and scope of the invention as set forth in the claims.

What is claimed is:

1. A method of performing a start-up of a flow cell system, wherein electrolyte is flowed through cells in a stack of the flow cell system with circulation pumps, comprising:
    performing a static plating by applying a current to a stack of the flow cell system with the circulation pumps turned off to plate a catalyst dissolved in the electrolyte onto electrodes of the cells in the stack;
    turning circulation pumps on once the static plating step is completed to flow electrolyte through the stack of the flow cell system.

2. The method of claim 1, further including
    performing a trickle plating process by applying a current with the circulation pumps ON;
    performing a pulse plating process by applying a pulsed voltage with the circulation pumps ON; and
    performing an initial plating process by initially charging the flow cell.

3. A flow cell system, comprising a flow cell stack;
    a first circulation pump fluidically coupled between a first electrolyte tank and the flow cell stack to circulate the a electrolyte through the flow stack;
    a second circulation pump fluidically coupled between a second electrolyte tank and the flow cell stack to circulate a second electrolyte through the flow stack;
    a first mixing valve fluidically coupled between the first circulation pump and the second circulation pump to allow for mixing of the first electrolyte and the second electrolyte in the second electrolyte tank;
    a second mixing valve fluidically coupled between the second circulation pump and the first circulation pump to allow for mixing of the second electrolyte and the first electrolyte in the first electrolyte tank; and
    a start-up controller configured to:
        provide voltages and currents to the stack;
        provide control signals to the first circulation pump and the second circulation pump;
        provide control signals to the first mixing valve and the second mixing valve, wherein the start-up controller, upon start-up of the flow cell system,
        cause the system to perform a static plating by applying a current to the flow-cell stack of the flow cell system with the first circulation pump and the second circulation pump turned off to plate a catalyst dissolved in the electrolyte onto electrodes of cells in the flow-cell stack; and
        turn the first circulation pump and the second circulation pump on once the static plating step is completed to flow electrolyte through the flow-cell stack of the flow cell system.

4. The system of claim 3, further including a first check valve coupled between the first circulation pump and the flow cell stack and a second check valve coupled between the second circulation pump and the flow cell stack.

5. The system of claim 3, wherein the start-up controller is further configured to:
    provide a small current to the flow cell stack with the first circulation pump and the second circulation pump OFF;
    provide a current with the circulation pumps ON;
    apply a pulsed voltage with the circulation pumps ON; and
    perform an initial plating process by initially charging the flow cell.

* * * * *